A. Thompson,
Mortising Machine,
No. 3,054. Patented Apr. 25, 1843.
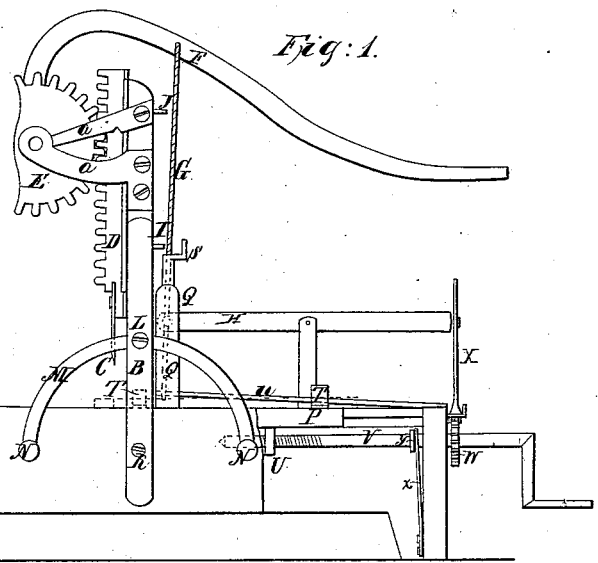
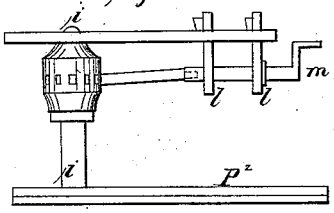
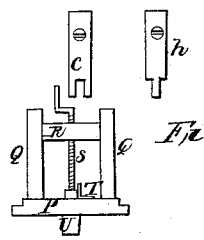
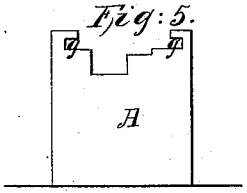
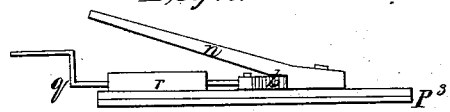
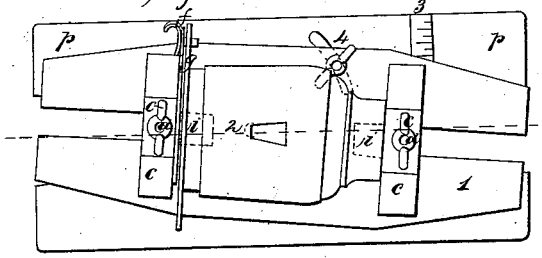

UNITED STATES PATENT OFFICE.

ARCHIBALD THOMPSON, OF WAYNESBORO, PENNSYLVANIA.

MACHINE FOR MORTISING HUBS.

Specification of Letters Patent No. 3,054, dated April 25, 1843.

*To all whom it may concern:*

Be it known that I, ARCHIBALD THOMPSON, of Waynesboro, Franklin county, State of Pennsylvania, have invented a new and useful Improvement in Machines for Boring and Mortising Hubs and Tenoning Spokes of Carriage-Wheels, and for other Purposes, which is described as follows, reference being had to the annexed drawings of the same, making part of this specification.

Figure 1 is a side elevation of the machine, a part of the bench being omitted in order to show the spoke carriage and nut and the propelling screw and spring. Fig. 2 is a side elevation of a carriage in which the hub is to be placed to be bored and mortised, the hub being shown in its proper place. Fig. 3 is a side elevation of another carriage containing a post on which the hub is placed after the spokes are inserted for having the round tenons cut on their outer extremities by a socket auger which is shown in its proper place for that purpose. Fig. 4 is a side elevation of another carriage on which the fellies are clamped to have the holes bored in them for the round tenons of the spokes, the auger for performing this operation being shown in its proper place. Fig. 5 view of the end of the bench showing the grooves in which the tongues of all the carriages slide. Fig. 6 end view of one of the carriages showing the tongues thereon. Fig. 7 the circular perforated gage plate fastened to the end of the hub for gaging the mortises, the edge of which is shown in Fig. 2. Fig. 8 plan of the cutter for making the square tenon on the spoke. Fig. 9 plan of the cutter for making the mortises in the hub to receive the square tenon of the spokes. Fig. 10 auger for boring the hubs. Fig. 11 combination for cutting the splay of the mortise.

Similar letters refer to corresponding parts.

The bench A for containing and supporting the several parts is made of suitable size, strength and material.

The vibrating adjustable frame B carrying the cutters C for cutting the tenons, rising and falling rack bar D to which the cutters are fastened, segment cog wheel E for moving the rack bar, lever E for turning the segment wheel to which the chain or cord G is attached which is also attached to the end of a horizontal vibrating lever H connected at its other end to the feed apparatus and perforated plates I J for the insertion of the auger *o* for boring the hubs, turns on horizontal bolts K passed through the lower part of frame B and inserted into the sides of the bench A being held at any required angle by screws L passed through the frame B and screwed against semicircular plates M placed in mortises in the frame B and fastened to the sides of the bench at the extremities thereof by screws or bolts N.

The carriage P upon which the spoke is held for having the tenon cut thereon by the forked cutter C is a rectangular board tongued on the edges to correspond with the grooves on the inner sides of the bench in which it moves into which carriage are mortised and tenoned two parallel posts Q united by a horizontal connecting timber R through which passes a vertical screw S which is screwed down upon the spoke for holding it firmly upon the carriage the spoke being prevented from having a lateral movement by two knees T T fastened to the carriage P, the position of the spoke being represented by dotted lines in Fig. 1.

A nut U is fastened to the under side of the carriage.

A horizontal feed screw V for moving the carriage works in this nut. The screw extends through and beyond the end of the bench and enters the center of a circular notched plate W or ratchet wheel fixed to and turned with said screw by means of a reaching arm *x* or pawl which acts against the teeth of the ratchet wheel to turn it and thus to turn the screw and feed or advance the carriage and spoke gradually toward the cutter said reaching arm or pawl being attached to the opposite end of the lever H from that which is attached to the curved lever F and from which it receives its motion at every stroke of the lever, the raising of the outer end of lever F drawing upward the inner end of the lever H by means of the cord G which connects the two levers and at the same time depressing the outer end of the lever H to which the pawl is attached and causing it to turn the ratchet wheel and screw and advance the carriage with the spoke to the knife and as this movement takes place the cutter rises and before it is quite out of the spoke the cutter would be broken if means were not taken to prevent such occurrence, and for this purpose the screw is permitted to recede while the cutter is in the spoke—at the same time contracting a spring $x$ fastened to the inside of the bench by one of its ends while its other end presses against a collar $y$ fixed to the screw; which spring, when the cutter is raised from the spoke, pushes forward the carriage and the spoke the distance of the chip to be cut at the next downward stroke of the cutter.

The collar is fixed on the screw at a distance from the ratchet wheel sufficient to give the screw its requisite longitudinal movement for the purpose above stated and the end of the pawl should be made broad so as not to be thrown out of gear with the ratchet wheel during this longitudinal backward and forward movement of the screw.

The pawl is raised in order to take another hold of the ratchet wheel by means of a spring $w$ attached by one of its ends to the ends of the lever H opposite to that to which the pawl is attached while the other end of the spring is fastened to the top of the bench said spring being contracted when the end of the lever H, to which it is attached is raised which takes place on the descent of the cutter and pawl and extended when the cutter is raised and the connecting cord G is loosened which draws down the end of the lever H to which it is attached and raises the opposite end to which the pawl is attached.

The segment cog wheel E for propelling the cutter may be a little more or less than a semi circle and turns on an axle in arms $a$ fastened to the sides of the adjustable frame B so that it be made to take a greater or less hold on the rack D of the cutter C for the purpose of giving the cutter a greater or less vertical movement as required by turning the segment and bringing the lower tooth to the required tooth of the rack for the purpose intended.

The lever F is made in the form of a hook having its hook end fastened to the segment cog wheel and the cord G of the feed lever to it about one third its length from the segment which cord must be unfastened when the rack is raised for the purpose of changing its length of movement vertically.

To alter the angle of cutting of the cutters the adjustable frame B must be turned on the bolt K till it assumes the angle required and it must then be secured in that position by the screw L screwed against the semicircular plate M over which the frame moves in the segment of a circle. The cutters, gearing and lever moved with the frame B being attached thereto.

For boring the hub preparatory to cutting the mortises for the spokes it must be placed on a horizontal axle $b$ Fig. 2 passed through perpendicular posts $c\ c$ rising from the carriage $p$, held firmly by vertical screw bolts $d$ and nuts $e$ said screw bolts being passed vertically through the posts the hub being prevented from turning on the axle by a spring catch $f$ fastened to one of the posts $c$ the point of which entering an aperture in a circular gage plate $g$ fastened to the end of a hub, which plate is perforated with a circular row of apertures corresponding with the required mortises in the hub as seen in Fig. 7.

The carriage $p$ for holding the hub for the operation of boring and mortising is inserted in the grooves $g$ of the bench A (see Fig. 5) and brought under the perforated brackets II Fig. 1. The auger $o$ Fig. 10 is then passed through these brackets I Fig. 1 and applied to the hub. When a hole is bored the spring catch $f$ is receded from the gage plate $g$ which, with the hub is then turned till the catch is opposite the next aperture into which it is inserted. Another hole is then bored in a similar manner and so on until all the holes are bored. Then move the carriage back until the holes thus bored are under the cutter shaft D from which remove the forked cutter $c$ and substitute the plain cutter $h$ Fig. 9 the butt end of said cutter entering a mortise in the lower end of shaft D and secured by a screw. Then cut the mortise in the manner that the tenons were cut on the spokes. Then remove the hub from the axle $b$ and insert the spokes in the mortises thus cut and prepare for cutting the round tenons on the small ends of the spokes. This is performed by placing the hub on a vertical spindle $i$ Fig. 3 inserted in the carriage $P^2$ and applying a horizontal turning bar $k$ to the head of the spindle above the hub from which two parallel hanging posts $e\ e$ project downward perforated for the insertion of a socket auger $m$ for cutting the round tenons.

This carriage is then placed in the grooves of the bench A, when a round tenon is cut on a spoke, the bar $k$ is turned on the spindle and the auger applied to the next spoke which is operated on in the same manner and in this manner all the spokes are provided with round tenons on their outer extremities being of the same length and distance from the center of the hub determined by the length of the radius of the circle in which bar $k$ moves.

To bore the holes in the fellies to admit the aforesaid round tenons of the spokes the fellies are clamped to the carriage $P^3$ Fig. 4 by the turning clamp bar $n$. The auger $q$ is then inserted in a horizontal aperture in a block $r$ fastened to the top of the carriage and brought against the concave part of the felly $o$ at the center thereof and the hole bored. The holes in the ends of the fellies for the dowel pins are bored in the usual manner.

In order to change the position of the hub in relation to that of the cutter for the purpose of forming the splay of the mortises to correspond with the large or splayed ends of the spokes according to any given angle a horizontal turning table 1 must be combined with the longitudinally sliding carriage $p$ upon which table the hub is to be secured in the manner above described for the carriage $p$. The table 1 turns on a vertical pin 2 passing through the table into the carriage. A segment plate 3 on which a scale is engraved is fastened to the top of the carriage. The index is on the table. This scale is for ascertaining the degree required to bring the axis of the hub right or left of the longitudinal center of the carriage represented by the dotted line. The turning table is fastened at any required position on the carriage by a clamp 4.

The spoke may be secured on the turning table instead of the hub for having the splayed tenon cut thereon.

What I claim as my invention and desire to secure by Letters Patent is—

The combination of the spring $x$ with the screw V as described and for the purpose set forth.

ARCHIBALD THOMPSON.

Witnesses:
   Wm. P. Elliot,
   Edwin Maher.